United States Patent
Barbagli

(10) Patent No.: US 6,196,481 B1
(45) Date of Patent: Mar. 6, 2001

(54) GRINDING DEVICE FOR DRIED SPICES AND HERBS

(75) Inventor: Costantino Barbagli, Florence (IT)

(73) Assignee: Drogheria E Alimentari S.r.l., Prato (IT)

( * ) Notice: Subject to any disclaimer, the term of this patent is extended or adjusted under 35 U.S.C. 154(b) by 0 days.

(21) Appl. No.: 09/396,192

(22) Filed: Sep. 14, 1999

(30) Foreign Application Priority Data

Sep. 14, 1998 (IT) .......................................... MI9800604 U

(51) Int. Cl.[7] .................................................. A47J 42/04
(52) U.S. Cl. .......................................... 241/30; 241/169.1
(58) Field of Search ............................... 241/169.1, 168, 241/30

(56) References Cited

U.S. PATENT DOCUMENTS

| | | | |
|---|---|---|---|
| 2,184,719 | * | 12/1939 | Mantelet ............................ 241/169.1 |
| 3,136,491 | * | 6/1964 | Posmanter ......................... 241/169.1 |
| 4,771,955 | * | 9/1988 | Paulson ............................. 241/169.1 |
| 4,960,246 | * | 10/1990 | Fohrman ........................... 241/169.1 |
| 5,088,652 | * | 2/1992 | Chen ................................. 241/169.1 |

* cited by examiner

Primary Examiner—Mark Rosenbaum
(74) Attorney, Agent, or Firm—Sheridan Ross P.C.

(57) ABSTRACT

A grinding device for grinding dried spices and herb, as well as other materials, is disclosed. In particular, the grinding device has a movable member which rotates about an axis and a fixed member. The movable member has a closure surface having a plurality of apertures and a grinding surface having a first series and a second series of ribs. The ribs of the second series have a pitch and a height which are less than those of the ribs of the first series. The fixed member has a complementary grinding surface. The complementary grinding surface has a first series of complementary ribs at the level of the first series of ribs of the movable member, and a second series of complementary ribs at the level of the second series of ribs of the movable member. The ribs of the second series of complementary ribs have a pitch and a height which are less than those of the ribs of the first series of complementary ribs. The complementary grinding surface has ribbed zones alternating with smooth zones.

13 Claims, 2 Drawing Sheets

GRINDING DEVICE FOR DRIED SPICES AND HERBS

DESCRIPTION

1. Field of the Invention

The present invention relates to a grinding device for dried spices and herbs.

2. Background art

Various types of mills are known for pepper and other spices. In these devices, grinding is effected by friction between a fixed part and a movable part. The two parts have, on the respective contact surfaces, teeth or sharp-edged corrugations which are intended to grind the pepper grains by friction. In reality, said surfaces are not in contact, but are spaced so as to create between them an air gap which determines the final grain size of the ground material. Grinding is effected by rotating the movable part with respect to the fixed part, so that the pepper grains are "seized" between the teeth of the mill and are finely ground by the latter to the desired dimension.

This type of mill, however, requires the grains to be ground to be already of sufficiently small size and furthermore to be sufficiently hard so as not to form a compact mass which is difficult to grind. It is not therefore possible to use this type of mill to grind, for example, dried mushrooms, which are characterized by pieces which are frequently of considerable and non-uniform size and which furthermore often have a softness such as to form in the known mills a paste which is difficult to grind.

SUMMARY OF THE INVENTION

The present invention overcomes the problems of the prior art by providing a universal grinding device, suitable for grinding both pepper and other spices and dried food products such as, for example, dried mushrooms.

This result has been achieved by means of a grinding device comprising:
a movable member, rotating about an axis, which comprises a closure surface having a plurality of apertures and a grinding surface having a first and second series of ribs, the ribs of said second series having a pitch and a height which are less than those of the ribs of the said first series;
a fixed member, which comprises a complementary grinding surface having a first series of complementary ribs, at the level of the said first series of ribs, and a second series of complementary ribs, at the level of the said second series of ribs, the ribs of said second series of complementary ribs having a pitch and a height which are less than those of the ribs of said first series of complementary ribs.

BRIEF DESCRIPTION OF THE DRAWINGS

The characteristics and advantages of the grinding device of the present invention will become clear from the description of some preferred embodiments thereof, provided hereinafter by way of non-limiting example, with reference to the appended drawings.

DETAILED DESCRIPTION OF THE INVENTION

Figure 1:
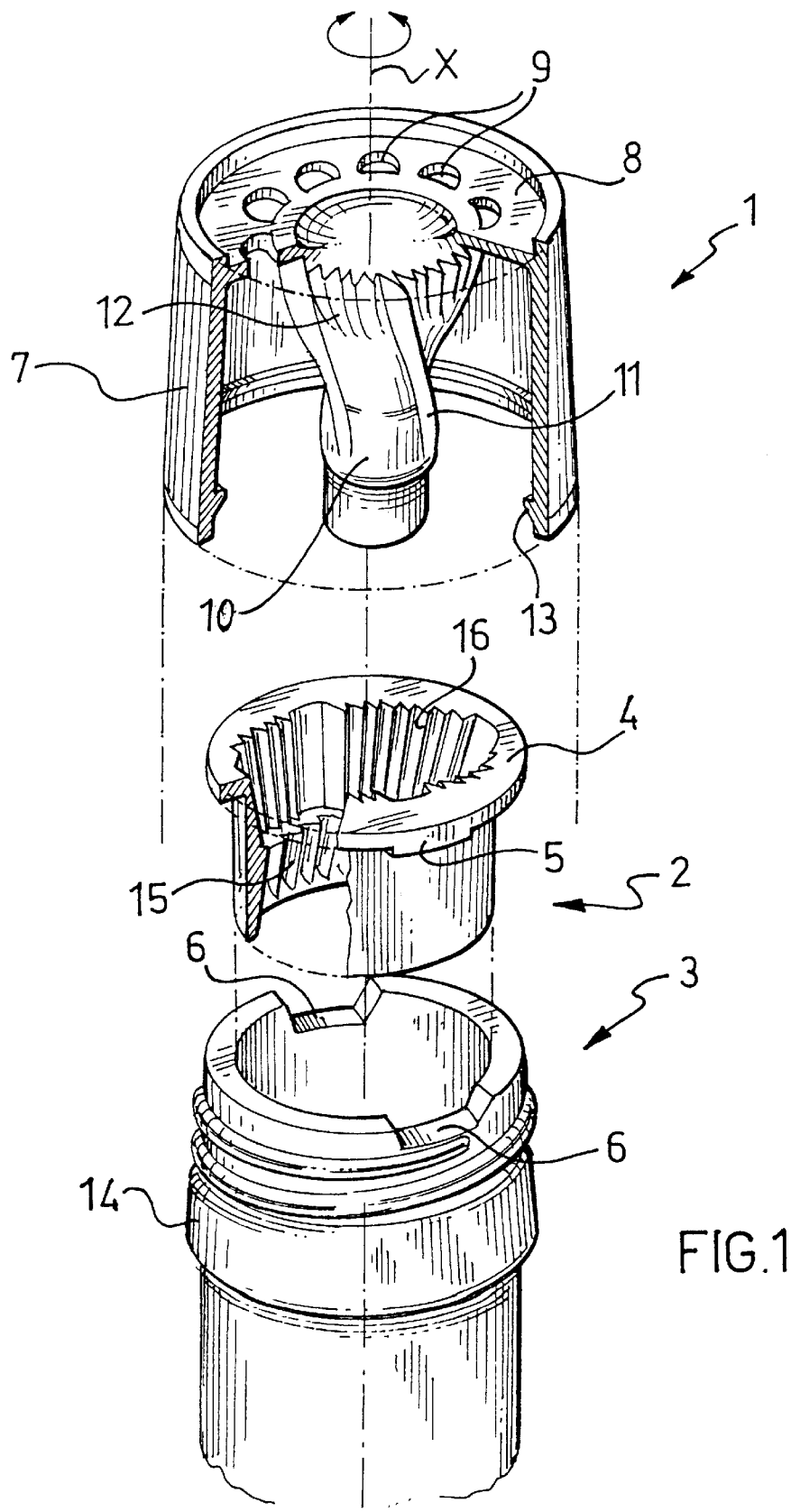
FIG. 1 shows a perspective exploded view in partial section of the grinding device of the present invention.
Figure 2:
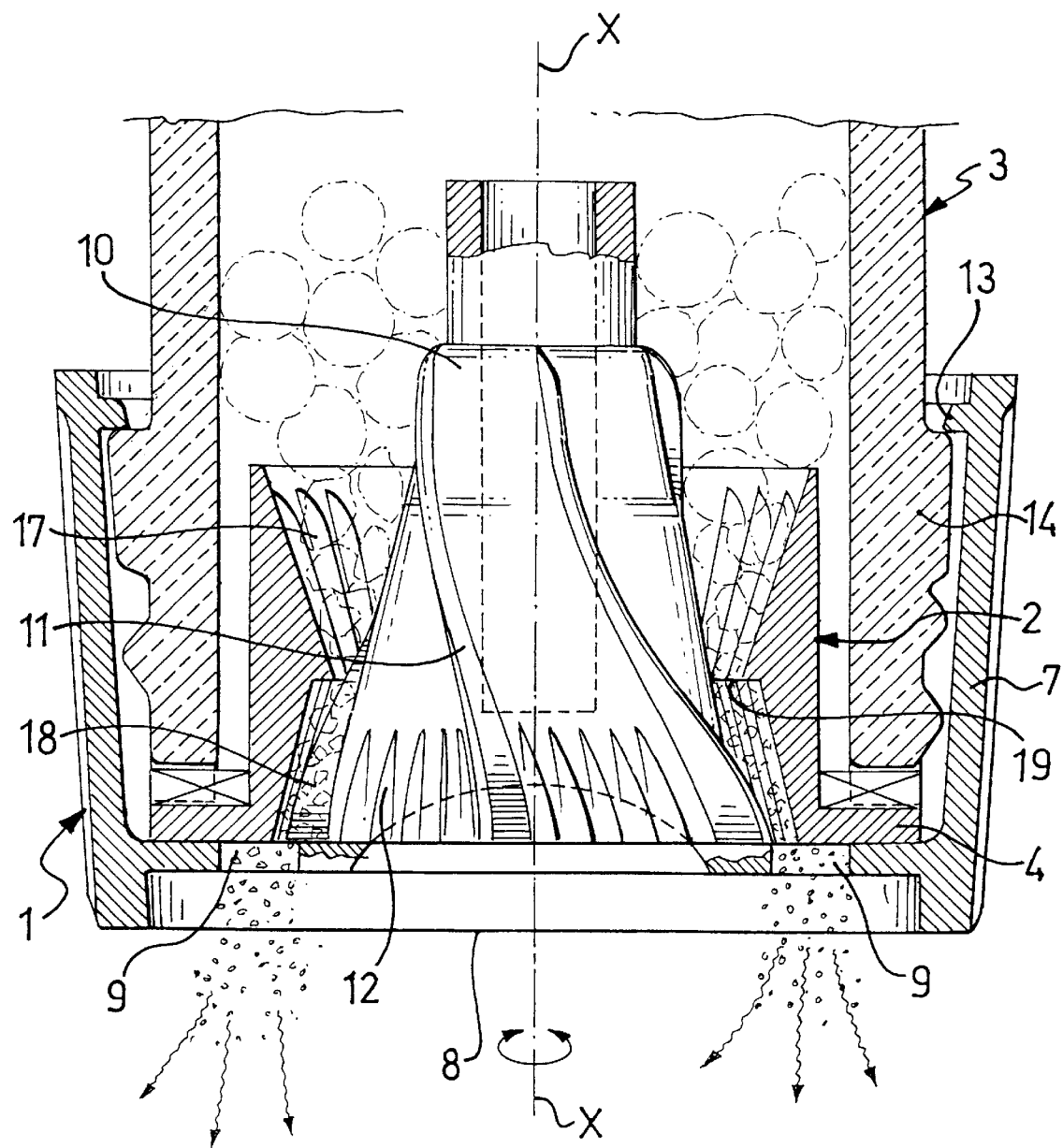
FIG. 2 shows a sectional view of the device in FIG. 1, turned upside down.

Referring to FIGS. 1 and 2, the grinding device of the present invention comprises a movable member 1 and a fixed member 2, intended to engage with the neck 3 of a spice container (shown only partially).

The movable member 1 comprises a support having a substantially cylindrical surface 7 bounded at one end by a closure surface 8. Starting from said closure surface 8, there extends in the direction of extension of said cylindrical surface 7 a body 10 of frustoconical shape which forms a cavity between said cylindrical surface 7 and the frustoconical body 10 itself.

The surface of the frustoconical body 10, termed grinding surface, comprises a first series 11 and a second series 12 of ribs, in which the ribs of said second series 12 have a pitch and a height which are less than those of the ribs of the said first series 11. Moreover, preferably, the ribs of said second series 12 cover over only that part of the grinding surface which is close to the closure surface 8. More preferably, the ribs of said second series 12 cover from ⅕th to ¼ of the entire grinding surface.

In the preferred embodiment of the present invention, shown in FIGS. 1 and 2, at least one of said series of ribs has ribs with a substantially helical profile.

The closure surface 8 furthermore has a plurality of apertures 9 arranged in a ring round the base of said frustoconical body 10.

Said apertures 9 preferably have a crescent shape, with the convex side turned towards the centre of the closure surface 8 at the base of the frustoconical body 10. This particular shape has the advantage of making it more difficult for the larger grains being ground to escape, increasing their dwell time inside the mill. Said characteristic makes it possible to obtain more homogeneous grinding of the grains.

The cylindrical surface 7 has inside it an annular relief 13, arranged in proximity to the open end of said surface 7, and capable of snapping onto a corresponding annular relief 14 provided on the neck 3 of the spice container. In this way, the movable part 1 is rotatably supported on said neck 3.

The fixed member 2 has an outer cylindrical surface terminating at one end in a flange 4. The lower surface of said flange 4 has one or more raised portions 5, capable of engaging with corresponding notches 6 provided on the edge of said neck 3 of the spice container, so as to prevent rotation of the fixed member 2 about the longitudinal axis X.

The presence of the annular relief 13 on the movable member 1, together with the presence of said raised portions 5 on the fixed member 2, makes it possible to simplify considerably the assembly of the device on an industrial scale, increasing accuracy of execution and productivity (smaller number of operations required).

The inner surface of said fixed member 2 defines a complementary grinding surface on which are provided a first series 15 and a second series 16 of complementary ribs, placed respectively at the level of said first series 11 and second series 12 of ribs on said frustoconical body 10. The ribs of said second series 16 of complementary ribs have a pitch and a height which are less than those of the ribs of said series 15.

Preferably, said ribs and complementary ribs have a sawtooth profile, with an inclined flank and a vertical flank, which form a sharp edge at the apex.

In the preferred embodiment of the present invention, shown in FIGS. 1 and 2, said complementary grinding surface of the fixed member 2 has two sections of frustoconical shape, converging towards the centre so as to form a surface having substantially the shape of an hour-glass, the first of said sections comprising said first series 15 of complementary ribs and the second of said sections comprising said second series 16 of complementary ribs.

In each case, the inside diameter of said fixed member 2 is always such as to form an air gap between said complementary grinding surface and the grinding surface of the frustoconical body 10, so as to allow the particles of the spices and dried herbs being ground to be seized between the teeth and, once ground, to fall towards the apertures 9.

It is also preferable for said complementary grinding surface to have ribbed zones alternating with smooth zones, so as to create actual grinding zones and zones without ribs in which the release of the ground material is facilitated.

With reference to FIG. 2, the grinding device of the present invention is assembled in the following manner. The fixed member 2 is inserted into the neck 3 of the spice container, fitting the raised portions 5 together with the corresponding notches 6 so as to prevent its rotation about the axis X. The movable member 1 is then inserted coaxially with said fixed member 2, until the annular relief 13 snaps into the corresponding relief 14 of the neck 3, leaving the said movable member 1 free, however, to rotate about the axis X. Between the grinding surface of said frustoconical body 10 and the complementary grinding surface of said fixed member 2, two grinding zones 17, 18 are created, communicating by way of an annular air gap 19 formed at the point where the two frustoconical sections of said complementary grinding surface meet.

The lower grinding zone 18, moreover, communicates with the outside by means of the apertures 9.

Still with reference to FIG. 2, the operation of the grinding device of the present invention is as follows. When the spice container is turned upside down, as shown in FIG. 2, the grains, for example, peppercorns, are conveyed inside the upper grinding zone 17, which for this purpose has a flared funnel shape. In said zone 17 a first, coarse grinding takes place, which is obtained by rotating the movable member 1 about the longitudinal axis X. In this way, the grains are seized between the ribs 11, 12 and the complementary ribs 15, 16 of the body 10 and of the fixed member 2, respectively, and are then ground by friction. The grain size of the ground material in this zone 17 depends on the width of the annular air gap 19, through which the grains, partially ground, pass by gravity into the second zone 18, in which fine grinding takes place.

The zone 18 is in fact characterized by a smaller distance between the grinding surface and the complementary grinding surface, so that the grains are finely ground and then fall by gravity towards the outside through the apertures 9.

The rotational movement of said movable member 1 about the axis X is typically an alternating movement in a clockwise/anticlockwise direction. While movement in one direction brings about the grinding of the grains, movement in the other direction frees them from engagement between the ribs, allowing them to fall by gravity into the next zone or towards the outside.

The grinding device according to the present invention therefore makes it possible also to grind dried food products such as dried mushrooms, inasmuch as the first grinding zone 17 is capable of reducing the larger pieces, making them sufficiently small to be able to be transferred to the second grinding zone 18, where the actual grinding takes place.

It is clear that what has been described is only a particular embodiment of the grinding device of the present invention, to which a person skilled in the art will be capable of making all modifications necessary for its adaptation to particular applications, without thereby departing from the scope of protection of the present invention.

What we claim is:

1. A grinding device comprising:
    a movable member, rotating about an axis (X), which comprises a closure surface having a plurality of apertures and a grinding surface having a first series and a second series of ribs, the ribs of said second series having a pitch and a height which are less than those of the ribs of said first series;
    a fixed member, which comprises a complementary grinding surface having a first series of complementary ribs, at the level of said first series of ribs, and a second series of complementary ribs, at the level of said second series of ribs, the ribs of said second series of complementary ribs having a pitch and a height which are less than those of the ribs of said first series of complementary ribs wherein said complementary grinding surface has ribbed zones alternating with smooth zones.

2. A grinding device according to claim 1, wherein at least one of the said series of ribs has ribs with a substantially helical profile.

3. A grinding device according to claim 1 or 2, wherein said movable member comprises a frustoconical body on which is defined a grinding surface which comprises said ribs.

4. A device according to claim 3, wherein said apertures have a crescent shape with a convex side turned towards the center of said closure surface at the base of said frustoconical body.

5. A grinding device according to claim 1 or 2, wherein said complementary grinding surface of said fixed member has two sections of frustoconical shape, converging towards the centre so as to form a surface having substantially the shape of an hour-glass, the first of said sections comprising said first series of complementary ribs and the second of said sections comprising said second series of complementary ribs.

6. A grinding device according to claim 1 or 2, wherein said ribs and complementary ribs have a sawtooth profile, with an inclined flank and a vertical flank, which form a sharp edge at the apex.

7. A device according to claim 1 or 2, wherein said movable member comprises a cylindrical surface which has inside it an annular relief, arranged in proximity to the open end of said cylindrical surface, capable of snapping into a corresponding annular relief on a neck of a spice container.

8. A device according to claim 1 or 2, wherein said fixed member comprises a flange the lower surface of which has one or more raised portions, capable of engaging with corresponding notches provided on an edge of a neck of a spice container.

9. A device according to claim 1 or 2, wherein said second series of ribs covers only the part of the grinding surface which is close to the closure surface.

10. A device according to claim 9, wherein said second series of ribs covers over from $\frac{1}{5}$th to $\frac{1}{4}$ of the entire grinding surface.

11. A method for grinding dried spices and herb, comprising:
    engaging a movable member and a fixed member in a coaxial relationship such that a grinding surface of the movable member and a complimentary grinding surface of the fixed member are in close proximity and form an upper grinding zone between a first series of ribs located on said grinding surface and a first series of complimentary ribs located on said complementary grinding surface, and a lower grinding zone between a second series of ribs located on said grinding surface and a second series of complimentary ribs located on said complimentary grinding surface, wherein said complimentary grinding surface has ribbed zones alternating with smooth zones;

introducing grinding material at said upper grinding zone;

grinding said grinding material to a first grain size by rotating said movable member about said fixed member in a first direction;

releasing said grinding material through to said lower grinding zone by rotating said movable member about said fixed member in a second direction;

grinding said grinding material to a final grain size in said lower grinding zone by rotating said movable member about said fixed member in said first direction; and, releasing said grinding material through a lower end of said movable member by rotating said movable member about said fixed member in said second direction.

12. A method according to claim 11, wherein said first direction and said second direction are opposite.

13. A method according to claim 11, wherein said first direction is clockwise and said second direction is counterclockwise.

* * * * *